US011100623B2

(12) United States Patent
Anglin et al.

(10) Patent No.: US 11,100,623 B2
(45) Date of Patent: Aug. 24, 2021

(54) REAL TIME ESTIMATION OF INDOOR LIGHTING CONDITIONS

(71) Applicant: International Business Machines Corporation, Armonk, NY (US)

(72) Inventors: Howard N. Anglin, Leander, TX (US); Wei Ting Dong, Shanghai (CN); Shi Kun Li, Shanghai (CN); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/401,754

(22) Filed: May 2, 2019

(65) Prior Publication Data

US 2020/0349693 A1    Nov. 5, 2020

(51) Int. Cl.
   *G01J 1/42*      (2006.01)
   *G06T 7/60*      (2017.01)
   (Continued)

(52) U.S. Cl.
   CPC .......... *G06T 7/0002* (2013.01); *G01J 1/4204* (2013.01); *G06T 7/70* (2017.01); *G06T 7/97* (2017.01);
   (Continued)

(58) Field of Classification Search
   CPC .......... G06T 7/0002; G06T 7/70; G06T 7/97; G06T 7/60; G06T 2207/30192;
   (Continued)

(56) References Cited

U.S. PATENT DOCUMENTS

| | | | |
|---|---|---|---|
| 2014/0209254 A1* | 7/2014 | Birru ................. | H05B 47/11 |
| | | | 160/5 |
| 2015/0102208 A1* | 4/2015 | Appelboom .......... | G01J 1/4228 |
| | | | 250/208.2 |

(Continued)

FOREIGN PATENT DOCUMENTS

| | | |
|---|---|---|
| JP | H10340607 A | 12/1998 |
| WO | 2015128205 A1 | 9/2015 |
| WO | 2016154306 A1 | 9/2016 |

OTHER PUBLICATIONS

"Developement of a new model to predict indoor daylighting: Integration in CODYRUN software and validation"; Authors: A.H. Fakra, F. Miranville, H. Boyer, S. Guichard; Energy Conversion and Management, vol. 52 (2011); pp. 2724-2734; Elsevier; journal homepage: www.elsevier.com/locate/enconman; 11pgs.

*Primary Examiner* — Joseph W Becker
(74) *Attorney, Agent, or Firm* — Cantor Colburn LLP; Noah Sharkan

(57) ABSTRACT

A method of estimating an indoor lighting condition includes acquiring an image from a camera at a location within an indoor space at a selected time, determining the location from which the image is taken, and estimating an outdoor sunlight density based on the location and the selected time. The method also includes collecting a plurality of daylight factors, each daylight factor of the plurality of daylight factors corresponding to a characteristic of the indoor space, calculating an indoor daylight index for the indoor space in real time based on the outdoor sunlight density and the plurality of daylight factors, and presenting the indoor daylight index to a user in real time.

20 Claims, 4 Drawing Sheets

(51) Int. Cl.
  *G06T 7/00* (2017.01)
  *G06T 7/70* (2017.01)
(52) U.S. Cl.
  CPC ......... *G01J 2001/4266* (2013.01); *G06T 7/60* (2013.01); *G06T 2207/30192* (2013.01); *G06T 2207/30244* (2013.01)
(58) Field of Classification Search
  CPC .......... G06T 2207/30244; G01J 1/4204; G01J 2001/4266
  See application file for complete search history.

(56) References Cited

U.S. PATENT DOCUMENTS

| | | | |
|---|---|---|---|
| 2016/0041035 A1* | 2/2016 | Allen | G01J 1/4228 356/402 |
| 2018/0150972 A1* | 5/2018 | Zhu | G05D 1/0246 |
| 2019/0178711 A1* | 6/2019 | Rajagopalan | G01J 1/0437 |
| 2019/0294899 A1* | 9/2019 | Okubo | G06K 9/00825 |

* cited by examiner

REAL TIME ESTIMATION OF INDOOR LIGHTING CONDITIONS

BACKGROUND

The present invention relates generally to analysis of lighting conditions, and more specifically, to estimation of indoor lighting conditions based on multiple daylight factors.

Lighting conditions, especially characteristics related to amounts of daylight coming into indoor spaces, are significant considerations when designing and determining values of indoor spaces, such as commercial buildings, residential homes and rental properties. For example, architects and engineers consider lighting conditions in building design to assess internal natural light levels as perceived on working planes and surfaces. Natural indoor lighting conditions depend on a wide variety of factors and can thus be challenging to accurately assess.

SUMMARY

According to an embodiment of the present invention, a method of estimating an indoor lighting condition includes acquiring an image from a camera at a location within an indoor space at a selected time, determining the location from which the image is taken, and estimating an outdoor sunlight density based on the location and the selected time. The method also includes collecting a plurality of daylight factors, each daylight factor of the plurality of daylight factors corresponding to a characteristic of the indoor space, calculating an indoor daylight index for the indoor space in real time based on the outdoor sunlight density and the plurality of daylight factors, and presenting the indoor daylight index to a user in real time.

According to another embodiment of the present invention, a system for estimating an indoor lighting condition includes an input module configured to acquire an image from a camera at a location within an indoor space at a selected time, and a processing module configured to, in response to acquiring the image, perform in real time a method that includes determining the location from which the image is taken and estimating an outdoor sunlight density based on the location and the selected time. The method also includes collecting a plurality of daylight factors, each daylight factor of the plurality of daylight factors corresponding to a characteristic of the indoor space, calculating an indoor daylight index for the indoor space in real time based on the outdoor sunlight density and the plurality of daylight factors, and presenting the indoor daylight index to a user in real time.

According to another embodiment of the present invention, a computer program product for estimating an indoor lighting condition includes a computer readable storage medium having program instructions embodied therewith, the program instructions readable by a processing circuit to cause the processing circuit to perform a method that includes acquiring an image from a camera at a location within an indoor space at a selected time, determining the location from which the image is taken, and estimating an outdoor sunlight density based on the location and the selected time. The method also includes collecting a plurality of daylight factors, each daylight factor of the plurality of daylight factors corresponding to a characteristic of the indoor space, calculating an indoor daylight index for the indoor space in real time based on the outdoor sunlight density and the plurality of daylight factors, and presenting the indoor daylight index to a user in real time.

BRIEF DESCRIPTION OF THE DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in which:

DETAILED DESCRIPTION

Figure 1:
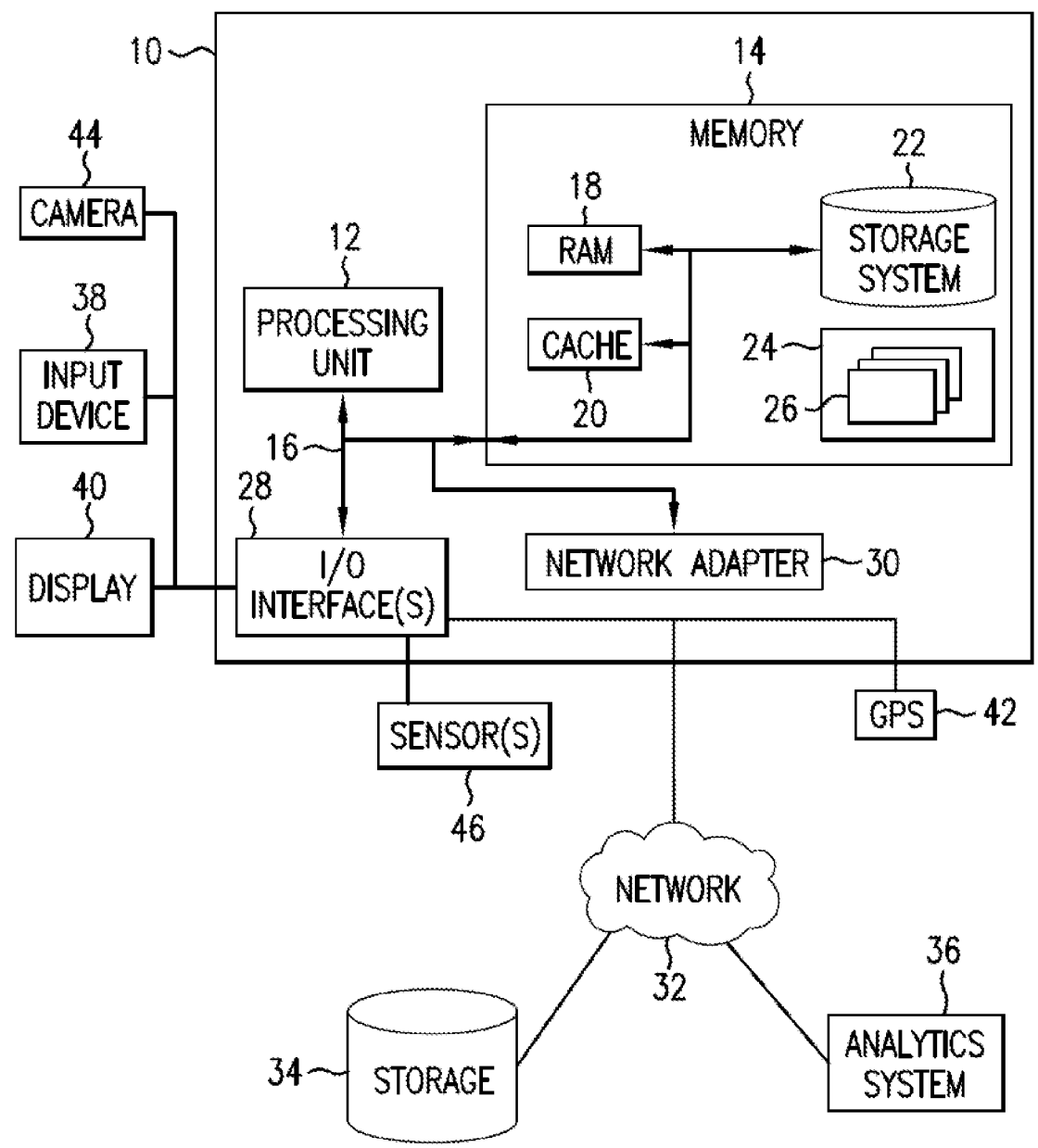
FIG. 1 depicts a processing device in accordance with an embodiment.

One or more embodiments of the present invention estimate daylight characteristics of an indoor space. An embodiment of a method of estimating daylight characteristics includes determining a location of the indoor space, collecting multiple daylight factors, and calculating an indoor lighting condition based on the daylight factors. One or more daylight factors may be calculated or estimated from an image taken by a user or retrieved from a storage location. In one embodiment, the method is performed in real time in response to the taking of an image from an indoor location, e.g., taking an image from a mobile device by a user.

In one embodiment, the method includes collecting multiple daylight factors in real time, such as a building location, window size and direction, nearby outside objects and others. The window size may be a combined size of multiple windows facing a given direction, or may be individual window sizes. One or more of the daylight factors can be estimated or inferred from one or more images taken by a user and/or sensors such as global positioning system (GPS) sensors and orientation sensors. A general indoor daylight index indicative of brightness due to natural light can be calculated using an outdoor sunlight density value and the daylight factors.

In one embodiment, the outdoor sunlight density and/or the general indoor daylight index can be estimated in conjunction with a simulation of a moving track of the sun. For example, sun position at various times is estimated using the moving track, and factors including service location (the geographic location of the indoor space), service direction (the direction at which a wall of the indoor space faces), and service elevation angle (an angle of sunlight incident on a building) are calculated for one or more times and/or dates. A sunlight density on a building can then be calculated based on the service location, service direction and service elevation angle, as well as any outdoor objects (e.g., other buildings, trees, etc.) that obstruct sunlight.

In one embodiment, the method includes presenting a comparison to a user, for example via a graphical user interface, of the calculated general indoor daylight index with one or more stored indexes from other indoor spaces. Such a comparison is useful to users, such as buyers or renters looking to compare characteristics of multiple homes or rental units.

Embodiments described herein provide a number of advantages and technical effects. For example, the embodiments described herein provide a real time system for calculating and presenting indoor lighting indexes to a user at the time a user is in an indoor space. The system is easy to use and can be accomplished using devices and sensors that can be readily integrated with a smartphone or other device. The system further allows for effective real time estimation of indoor lighting conditions under various conditions, such as different times and seasons, as well as different weather and/or climate conditions. It is noted that some embodiments may not have all of the above advantages, and that the above advantages are not necessarily required of all embodiments.

FIG. 1 illustrates an example of a computing device 10 that can be used to perform various actions, including receiving and processing user inputs and performing various processing actions as described herein, including storing and processing data, executing programs and displaying information. The device 10 may be configured to receive or gather communications (e.g., data, text, spoken words, emails, authentication information, etc.) from other locations, such as a network (e.g., Internet) and/or another processor (e.g., server, computer or mobile device). The device 10 may be any device capable of receiving input from users, sensors and/or other devices, performing processing actions and displaying text and other information to a user. Examples of the device 10 include as a mobile device (e.g., a smartphone), a wearable device (e.g., a smartwatch), a tablet computer, a laptop computer, a desktop computer, a mainframe a server and others.

The device 10 includes various components and/or modules for performing various processing, sensing and display functions. The device 10 includes one or more processors or processing units 12, a memory 14, and a bus 16 that couples various components including the memory 14 to the processor 12.

The memory 14 includes computer readable media in the form of volatile memory, such as random access memory (RAM) 18 and/or cache memory 20. The device 10 may also include other removable/non-removable, volatile/non-volatile computer system storage media. For example, the memory 14 includes storage 22 including a non-removable, non-volatile magnetic media (e.g., a hard drive), and/or removable storage media such as a memory card or flash drive. The memory 14 may include at least one program product having a set (e.g., at least one) of program modules that are configured to carry out the functions of embodiments described herein. For example, the memory 14 stores a program or utility suite 24 including one or more program modules 26 to carry out the functions and/or methodologies of embodiments described herein. The program 24 and/or program modules 26, in one embodiment, are configured as an application for estimating an indoor lighting condition as described herein. The application can be embodied as, e.g., a computer program and/or a smartphone or tablet application ("app").

The device 10 includes or is connected to various components, which may be incorporated in the device 10 or external to the device 10. The device 10 includes interfaces 28 for communication with components and may also include a network adapter 30 (e.g., a 3G/4G modem) for communication with other devices or components over a suitable network or remote connection. For example, the network adapter 30 allows for communication over a network 32, such as a wide area network (WAN) or the Internet. The system 10 can communicate over the network with a database 34 or other suitable location that stores information that can be used to perform indoor lighting analysis as described herein. For example, the database 34 can store information such as sun density data, saved indoor light indexes, geographic information, data regarding buildings or structures and others. The system 10 can also communicate with an analytics system 36 configured as, e.g., a server for performing lighting analysis and/or other functions.

The device 10 may be connected to or may include at least one input device 38 such as a touchscreen, keyboard, button and/or mouse, and a display 40. The input device 38 can be incorporated with the display 40, e.g., as a touchscreen. For example, as discussed further below, the display 40 can present a graphical user interface (GUI) that provides a means for a user to request a lighting analysis, input information (e.g., location, date, time, etc.) used to estimate an indoor lighting condition, and view lighting analysis results and images of a room or rooms (or other indoor space). The components shown in FIG. 1 and described herein are provided for illustrative purposes and are not intended to be limiting.

The device 10 may also include or be configured to various sensing devices, such as a global positioning system (GPS) device 42, a camera 44 and one or more other sensors 46 used to estimate lighting factors. Various other components may be incorporated in the device 10. For example, an imaging device such as a camera 44 is incorporated in or connected to the device 10 and is configured to record still images and/or video for use in, estimating daylight factors as described herein.

A processing device such as the device 10, the processing unit 12 and/or the analytics system 36 is/are configured to estimate a lighting condition in an indoor space, referred to herein as an "indoor lighting condition." The indoor lighting condition relates to the brightness of an indoor space due to natural light (i.e., daylight). In one embodiment, the indoor lighting condition is estimated as a "general indoor daylight index" (GIDI).

The processing device estimates the indoor lighting condition based on a measurement, estimation or simulation of the outdoor sunlight density in the area or location at which the indoor space is located, as well as multiple daylight factors. A "daylight factor" refers to a characteristic of the indoor space that can have an effect on the amount of daylight that is able to enter the indoor space. Examples of daylight factors include building layout, floor plan, building location, window size, window location and placement, window orientation, nearby structures or objects and others.

In one embodiment, each daylight factor is a weight, proportion or percentage value that can be applied to a sunlight density value. For example, the sunlight density can be expressed as a percentage or proportion, and each daylight factor is a value that can be subtracted from the sunlight density. An example of an equation that can be used to estimate lighting conditions is shown below. In this example, the lighting condition is a GIDI and is expressed as:

$$GIDIi = SunDens - (SD*Factor1 + SD*Factor2 + SD*Factor3 \ldots + SD*FactorN),$$

where $GIDIi$ is a GIDI for a selected room or space at a selected time and date, SunDens is the outdoor sunlight density, Factor1 is a first daylight factor, Factor2 is a second daylight factor, Factor3 is a third daylight factor, and N is the total number of daylight factors.

The sunlight density is affected by seasonal and weather conditions, and thus the processing device can utilize sunlight density value that is estimated using a reference sunlight density value and adjusting the reference sunlight density value based on conditions such as date, season and time of day. The reference sunlight density value can also be adjusted based on actual weather conditions at the time a lighting analysis is initiated, or based on average or typical weather conditions at the time. If a user desires to determine lighting conditions at other dates or seasons, the sunlight density value can be estimated base on average or typical weather at a selected time, date and/or season. In one embodiment, as discussed further below, the processing device includes a module or program for simulating the moving track of the sun over a selected day and/or over a longer time period (e.g., a month or season). The moving track simulation may be used to estimate an angle of sunlight toward the indoor space, which can be used in determining the sunlight density.

As noted above, the system 10 is configured to analyze lighting conditions in real time. "Real time" analysis refers to an analysis that is initiated and performed immediately upon, or proximate in time with, taking an image or otherwise requesting an analysis, and that can produce an output immediately upon completion. A real time analysis allows a user to assess lighting conditions at the time of request, for example, when the user is in the indoor space. Such real time analysis is useful to users such as buyers or renters when shopping for a home or rental unit.

In one embodiment, the processing device includes functionality for simulating the moving track of the sun at various dates. For example, a database or other storage location stores sun moving track data for various dates, times, seasons or other selected time periods, which can be accessed and used to estimate initial sun density at multiple times and calculate a GIDI for each of the multiple times. For example, a GUI or other display can present multiple images showing the GIDI over the course of a selected time period, and/or present the GIDIs in another form, such as a table, list or animation.

In one embodiment, the processing device is configured to receive user feedback regarding the calculated GIDI(s) and/or daylight factors. For example, a user can manually add or remove daylight factors and cause the GIDI(s) to be recalculated. In another example, the processing system can receive biometric input such as facial recognition to assess a user's level of satisfaction with the result. If the level of satisfaction is below a threshold, the processing device can prompt the user for manual feedback, such as additional factors or features (e.g., outdoor structures or objects) that can be used to re-calculate a calculated GIDI.

The processing device, in one embodiment, includes functionality for comparing lighting conditions in multiple indoor spaces. For example, lighting conditions at one or more dates, times and/or seasons can be stored and used to compare a calculated GIDI for an indoor space with GIDIs in other indoor spaces. This can be useful, for example, by renters or buyers to easily and in real time compare multiple homes or rental units.

Figure 2:
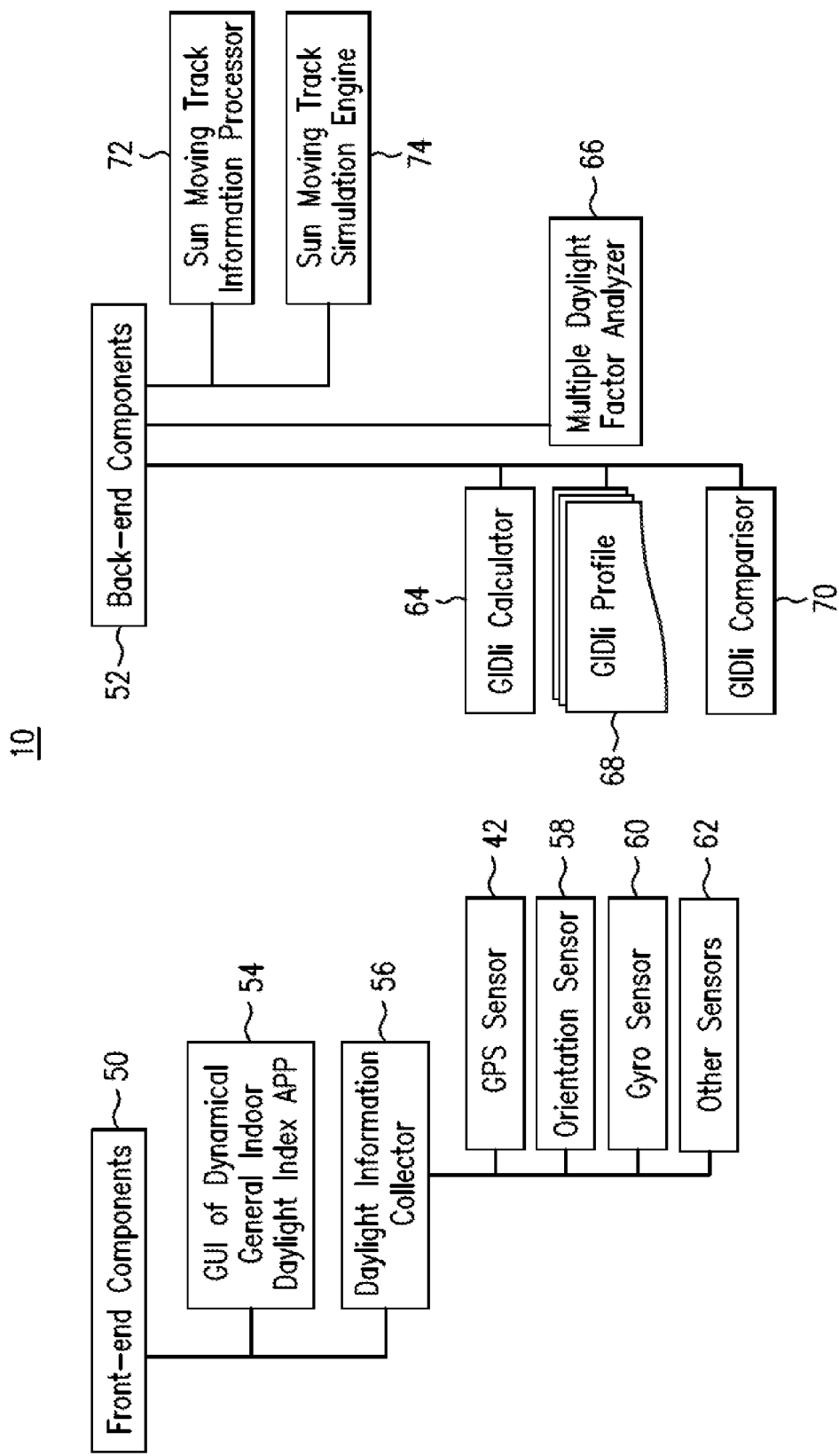
FIG. 2 depicts an embodiment of a processing environment in which a processing device may be used to perform embodiments described herein.

Aspects of an embodiment of the system 10 are shown in FIG. 2. In this embodiment, the system 10 includes one or more front-end components 50 and one or more back-end components 52. Front-end components refer to components that are displayed to a user, accessible by a user, output to a user and/or interacted with by a user. Back-end components refer to components that perform various functions and are not directly accessible by a user or not directly controllable by a user. It is noted that the specific location or characterization of components is not limited to the discussions herein.

The front-end components 50 include a user interface such as a GUI 54. The GUI can perform functions such as receiving input from a user (e.g., receiving an image or location, receiving a time and date, and/or receiving daylight factors such as window size, window orientation, objects outside of an indoor space and others), receiving and displaying outputs from various sensing devices and transmitting requests and data to the back-end components 52 for analysis. An input module such as a daylight information collector 56 collects data related to sunlight density and/or daylight factors. Other front end components include sensing devices such as the GPS device 42, an orientation sensor 58, a gyroscopic sensor 60 and other sensor(s) 62.

The back-end components generally include components for receiving data and requests, storing data (including input data, saved indoor light indexes, etc.) and performing aspects of lighting analysis. In this embodiment, the back-end components 52 include an indoor lighting index or GIDI calculator 64, a multiple daylight factor analyzer 66, an index storage module 68 for collecting and controlling storage of one or more saved lighting indexes or index profiles, and a comparator 70 for comparing index profiles from multiple locations. Other components may include modules for analyzing lighting conditions based on sun movement, such as a sun moving track information processor 72 and a sun moving track simulator 74.

Figure 3:
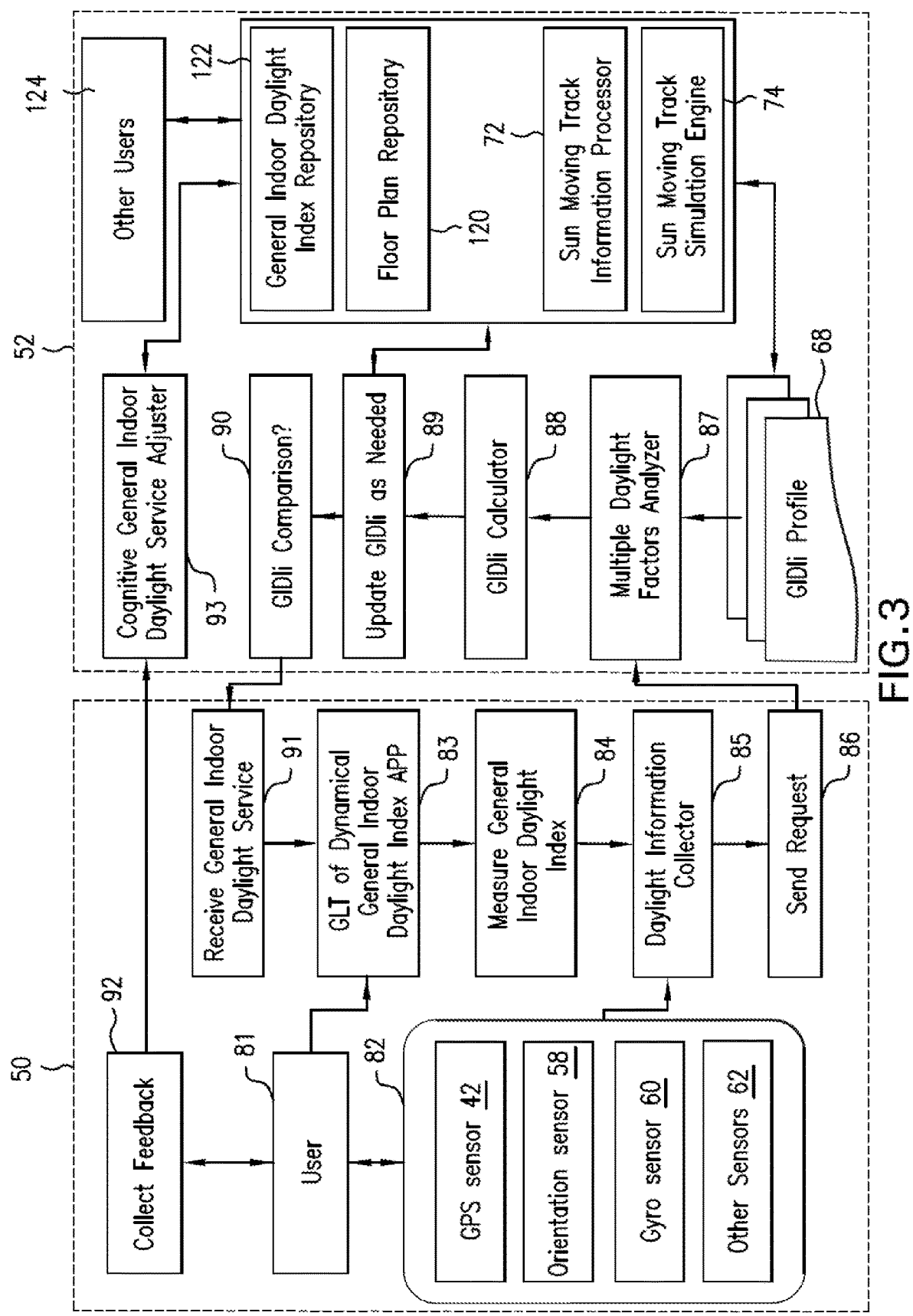
FIG. 3 is a flow diagram depicting an embodiment of a method of analyzing natural lighting in an indoor space.

FIG. 3 illustrates embodiments of a computer-implemented method 80 of estimating indoor lighting conditions. The method 80 may be performed by a processor or processors disposed in a mobile device, such as a smartphone, tablet, smartwatch etc. For example, aspects of the method 80 may be performed by an application stored in a smartphone. The method 80 is discussed in conjunction with the device 10 of FIG. 1 and components shown in FIG. 2 for illustration purposes. It is noted that aspects of the method 80 may be performed by any suitable processing device or system.

The method 80 includes a plurality of stages or steps represented by blocks 81-93, all of which can be performed sequentially. However, in some embodiments, one or more of the stages can be performed in a different order than that shown or fewer than the stages shown may be performed.

As shown in FIG. 3, some of the stages or steps of the method 80 may be performed by front-end components such as the front-end components 50, and some of the stages or steps may be performed by back-end components such as the back-end components 52. It is noted that the method 80 may be performed by any suitable number or combination of components, and is thus not limited to the particular components or configuration shown in FIG. 3.

At block 81, a user located in an indoor space such as a room in a building (e.g., an apartment) takes an image of the room from a selected location using a camera, or selects a pre-existing image. In one embodiment, the image can be taken using a camera integrated into a mobile device such as a smartphone or tablet. Taking or selecting the image may automatically trigger the lighting analysis, or a user may initiate the lighting analysis via the GUI 54. In one embodiment, the user can initiate the analysis without taking an image.

Figure 4:
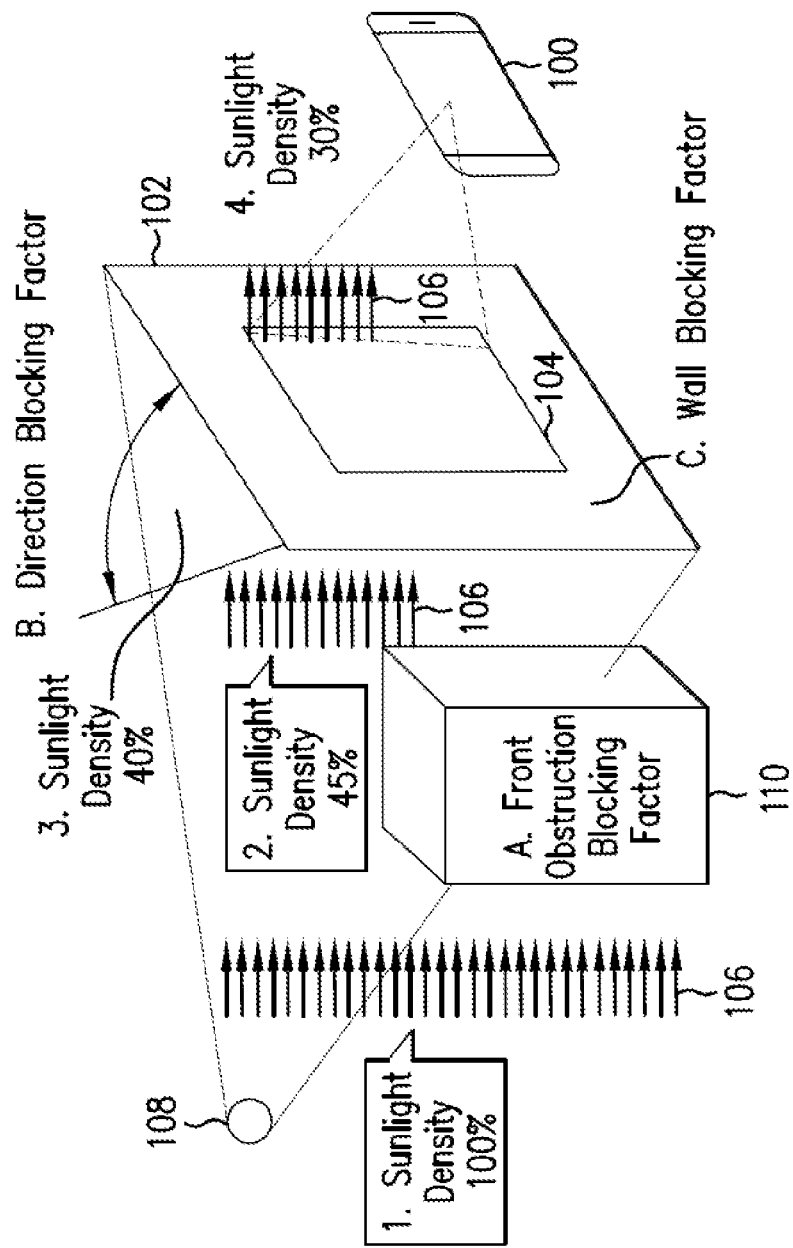
FIG. 4 depicts aspects of an example of a calculation of an indoor light index.

For example, as shown in FIG. 4, a user takes an image of a room in an apartment or other building using a camera installed in a smartphone 100. As shown, the room includes a wall 102 and a window 104. In this example, sunlight 106 from the sun 108 enters the room through the window 104, which is affected by outside structures such as a structure 110 or other obstruction, and daylight factors such as the direction toward which the wall 102 faces (referred to herein as a "service direction") and the size of the window 104.

At block 82, one or more sensors in the mobile device (or otherwise located proximate to the location) take measurements related to daylight factors. Such measurements include, for example, location, direction and orientation measurements. For example, the location of the indoor space (referred to herein as a "service location") is measured by the GPS device 42, roll and pitch of the smartphone is estimated using the orientation sensor 58, and yaw (direction in a horizontal plane) is estimated using the gyroscopic sensor 62. From such measurements, daylight factors such as service location, service direction and an elevation of the room (referred to herein as a "service elevation") are estimated.

It is noted that the daylight factors can be determined in various ways, which are not limited to the embodiments described herein. For example, yaw can be estimated using GPS information, either alone or in combination with the gyroscopic sensors. In another example, service location and/or service direction can be estimated or inferred from metadata associated with the image taken by the user. In a further example, daylight factors can be entered in the GUI 54 by the user and/or retrieved from stored information.

At block 83, the user interacts with the GUI 54 and requests a general indoor daylight index or GIDI (block 84). For example, the request may be made by selecting a button on the GUI 54, or the request may be made automatically in response to the user taking or selecting an image.

At block 85, data from the various measurement sensors is collected by the daylight information collector 56, and at block 86, a request is sent to the multiple daylight factors analyzer 66.

At block 87, the multiple daylight factors analyzer 66 receives the request and analyzes the sensor information and/or other information provided by the user or otherwise acquired. A plurality of daylight factors are estimated based on the information.

For example, information regarding the structure 110, such as height and width of the structure 110 orientation of the structure 110 and distance to the building are used to estimate a first daylight factor. The first daylight factor (Factor1) in this example is referred to as a front obstruction blocking factor, and is estimated at about 0.55 or 55%. The first daylight factor can be calculated based on calibration information or a calculation based on the area or volume of the structure and sunlight angle information.

The second daylight factor (Factor2) in this example is based on the service direction (the direction at which the wall 102 is facing), and is referred to as a direction blocking factor. The direction blocking factor is calculated based on an angle between a surface facing directly toward the sun 108 and the surface of the wall 102. The angle is then correlated with a direction blocking factor of about 0.05 or about 5%. The correlation may be based on stored calibration information or by known calculations.

The third daylight factor in this example is a wall blocking factor calculated based on, for example, a proportion of the area of the window 104 relative to the area of the wall 102. In this example, the wall blocking factor is calculated as about 0.1 or about 10%.

At block 88, the multiple daylight factors are sent to the GIDI calculator 64, which calculates a GIDI based on an estimation of sunlight density and the daylight factors estimated by the multiple daylight factors calculator 66.

The sunlight density (SunDens) may be calculated or selected as an average annual index by season and/or date. For example, the sunlight density is calculated based on the position of the sun at the selected time for which the GIDI is to be calculated. The position of the sun can be acquired from the sun moving track information processor 72. The sunlight density may be adjusted based on weather or other outdoor conditions (e.g., cloudiness, rain, snow, etc.). For example, the sunlight density can be adjusted based on estimations of cloud cover at the selected time from weather forecasts or from estimations of average or normal cloud cover at the selected time.

The GIDI calculator 64 receives the sun density and daylight factors and calculates the GIDI. In the example of FIG. 4, the image or request is taken or provided at about 12 noon and at the time of year when the sun is at its highest point. The GIDI calculator 64 receives the outdoor sun density, which in this example is determined to be 100%, and the daylight factors discussed above. The GIDI then calculates the GIDI using equation (1) based on the sunlight density and the first, second and third daylight factors discussed above. In this example, a GIDI value of about 30% is calculated.

The GIDI calculator 64 may then output the GIDI to the GUI 54. The GUI 54 may then display the calculated GIDI in any suitable format. For example, the calculated GIDI is displayed as a number (e.g., 30%) and may also be visually displayed, for example by darkening or lightening the image to reflect the calculated GIDI.

In one embodiment, the GUI 54 also displays information regarding the moving track of the sun over some time period, such as a day, month, season or year. The moving sun track can be displayed to show the position of the sun at the selected time, and or display an animation or series of images showing the track of the sun and associated GIDIs, to provide the user with information regarding how the GIDI changes over time.

At block 89, additional information may be used to adjust the calculated GIDI if desired. For example, a floor plan repository 120 may be accessed to receive information regarding the position and location of the room in a building, which can be used to adjust one or more daylight factors and update the calculated GIDI accordingly.

At block 90, in one embodiment, the GIDI comparator 70 selects a number i of additional GIDIs for comparison with the calculated GIDI. For example, the GIDI comparator 70 retrieves an additional GIDI (referred to as "GIDIi") for comparison with the calculated GIDI. For example, the GIDIi is selected by the GIDI profile module 68 from saved GIDIs in a GIDI repository 122.

At block 91, the calculated GIDI and the additional GIDI(s) are displayed in the GUI 54 to allow a user to compare different rooms, buildings and/or other indoor spaces. Each GIDI may be associated with a different room in a different geographic location, and displayed in any suitable manner to allow the user to easily compare the levels of brightness of the rooms. For example, each GIDI can be displayed with an image of the associated room, and each image can be displayed with an associated location and a level of brightness indicative of the GIDI associated therewith.

At block 92, in one embodiment, the user may provide feedback via the GUI 54. The feedback may be additional information or features that can impact the GIDI, such as additional outdoor structures, adjustments to estimations of window size, and others. At block 93, a cognitive general indoor daylight service adjuster or other suitable module adjusts the calculated GIDI, which can then be displayed on the GUI 54 and/or saved in the repository 122. As shown in FIG. 3, the repositories 120 and 122, the sun moving track information processor 72 and/or the sun moving track simulator 74 may be accessible by one or more other users 124 (e.g., remote users).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of estimating an indoor lighting condition, the method comprising:
    acquiring an image from a camera at a location within an indoor space at a selected time;
    determining the location from which the acquired image is taken;
    estimating an outdoor sunlight density based on the location and the selected time;
    collecting a plurality of daylight factors, each daylight factor of the plurality of daylight factors corresponding to a characteristic of the indoor space, the plurality of daylight factors including an obstruction blocking factor, the obstruction blocking factor calculated based on dimensions of an outdoor object that at least partially blocks sunlight, and calculated based on a distance of the outdoor object from the location;
    calculating an indoor daylight index for the indoor space in real time based on the outdoor sunlight density and the plurality of daylight factors;
    retrieving a second indoor daylight index for a second indoor space from an indoor daylight index repository, retrieving an image of the second indoor space, and comparing the calculated indoor daylight index to the second indoor daylight index; and
    presenting to a user, in real time via a graphical user interface, the acquired image and the calculated indoor daylight index, the retrieved image of the second indoor space and the second indoor daylight index, and the comparison.

2. The method of claim 1, wherein the plurality of daylight factors include a direction toward which a wall of the indoor space is facing, and a window size.

3. The method of claim 1, wherein the camera is part of a mobile device controllable by the user, and one or more of the plurality of daylight factors are estimated based at least in part on one or both of the image and data from one or more sensors, the one or more sensors selected from the group consisting of a global positioning system (GPS) sensor, an orientation sensor and a gyroscopic sensor.

4. The method of claim 1, wherein the outdoor sunlight density is estimated based at least in part on an angle of sunlight, a location of the indoor space, and a facing direction of a wall of the indoor space.

5. The method of claim 4, wherein the angle of sunlight is estimated based at least in part on a position of the sun calculated from a simulation of a moving track of the sun, and an elevation of the indoor space.

6. The method of claim 1, wherein the acquired image is taken by a mobile device controllable by the user.

7. The method of claim 6, wherein calculating the indoor daylight index, retrieving the second indoor daylight index, and the presenting are automatically triggered by taking the acquired image using the mobile device.

8. The method of claim 7, wherein the acquired image is presented with a first brightness level corresponding to the calculated indoor daylight index, and the retrieved image is presented with a second brightness level corresponding to the second indoor daylight index.

9. The method of claim 1, wherein each daylight factor is provided as a weight or a proportion, and the calculated indoor daylight index is calculated based on subtracting the weight or the proportion of each daylight factor from the outdoor sunlight density.

10. A system for estimating an indoor lighting condition, the system comprising:
    an input module configured to acquire an image from a camera at a location within an indoor space at a selected time; and
    a processing module configured to, in response to acquiring the image, perform in real time a method that includes:
        determining the location from which the acquired image is taken;
        estimating an outdoor sunlight density based on the location and the selected time;
        collecting a plurality of daylight factors, each daylight factor of the plurality of daylight factors corresponding to a characteristic of the indoor space, the plurality of daylight factors including an obstruction blocking factor, the obstruction blocking factor calculated based on dimensions of an outdoor object that at least partially blocks sunlight, and calculated based on a distance of the outdoor object from the location;
        calculating an indoor daylight index for the indoor space in real time based on the outdoor sunlight density and the plurality of daylight factors; and
        retrieving a second indoor daylight index for a second indoor space from an indoor daylight index repository, retrieving an image of the second indoor space, and comparing the calculated indoor daylight index to the second indoor daylight index; and
        presenting to a user, in real time via a graphical user interface, the acquired image and the calculated indoor daylight index, the retrieved image of the second indoor space and the second indoor daylight index, and the comparison.

11. The system of claim 10, wherein the plurality of daylight factors include a direction toward which a wall of the indoor space is facing, and a window size.

12. The system of claim 10, wherein the outdoor sunlight density is estimated based at least in part on an angle of sunlight, a location of the indoor space, and a facing direction of a wall of the indoor space.

13. The system of claim 12, wherein the angle of sunlight is estimated based at least in part on a position of the sun calculated from a simulation of a moving track of the sun, and an elevation of the indoor space.

14. The system of claim 10, wherein the acquired image is taken by a mobile device controllable by the user, and calculating the indoor daylight index, retrieving the second indoor daylight index, and the presenting are automatically triggered by taking the acquired image using the mobile device.

15. The system of claim 10, wherein each daylight factor is provided as a weight or a proportion, and the calculated indoor daylight index is calculated based on subtracting the weight or the proportion of each daylight factor from the outdoor sunlight density.

16. A computer program product for estimating an indoor lighting condition, the computer program product comprising:
  a non-transitory computer readable storage medium having program instructions embodied therewith, the program instructions readable by a processing circuit to cause the processing circuit to perform a method comprising:
    acquiring an image from a camera at a location within an indoor space at a selected time;
    determining the location from which the image is taken;
    estimating an outdoor sunlight density based on the location and the selected time;
    collecting a plurality of daylight factors, each daylight factor of the plurality of daylight factors corresponding to a characteristic of the indoor space, the plurality of daylight factors including an obstruction blocking factor, the obstruction blocking factor calculated based on dimensions of an outdoor object that at least partially blocks sunlight, and calculated based on a distance of the outdoor object from the location;
    calculating an indoor daylight index for the indoor space in real time based on the outdoor sunlight density and the plurality of daylight factors;
    retrieving a second indoor daylight index for a second indoor space from an indoor daylight index repository, retrieving an image of the second indoor space, and comparing the calculated indoor daylight index to the second indoor daylight index; and
    presenting to a user, in real time via a graphical user interface, the acquired image and the calculated indoor daylight index, the retrieved image of the second indoor space and the second indoor daylight index, and the comparison.

17. The computer program product of claim 16, wherein the plurality of daylight factors include a direction toward which a wall of the indoor space is facing, and a window size.

18. The computer program product of claim 16, wherein the outdoor sunlight density is estimated based at least in part on an angle of sunlight, a location of the indoor space, and a facing direction of a wall of the indoor space.

19. The computer program product of claim 18, wherein the angle of sunlight is estimated based at least in part on a position of the sun calculated from a simulation of a moving track of the sun, and an elevation of the indoor space.

20. The computer program product of claim 16, wherein each daylight factor is provided as a weight or a proportion, and the calculated indoor daylight index is calculated based on subtracting the weight or the proportion of each daylight factor from the outdoor sunlight density.

\* \* \* \* \*